United States Patent [19]
Bittner et al.

[11] 3,981,664
[45] Sept. 21, 1976

[54] MAIN SHAFT SUPPORT FOR PELLET MILLS

[75] Inventors: Oszkar Bittner, South Williamsport; Chester Donald Fisher, Muncy, both of Pa.

[73] Assignee: Sprout, Waldron & Company, Inc., Muncy, Pa.

[22] Filed: Aug. 7, 1975

[21] Appl. No.: 602,808

Related U.S. Application Data

[63] Continuation of Ser. No. 517,910, Oct. 25, 1974, abandoned.

[52] U.S. Cl. ............................... 425/331; 241/122; 308/15; 308/22; 425/382 R; 425/DIG. 230
[51] Int. Cl.² ........................................ B29C 17/14
[58] Field of Search .......... 425/331, 381, 382, 462, 425/73, 222, 223, 191, DIG. 230; 264/140, 141, 142, 143, 144; 308/15, 22; 241/91, 117, 122

[56] References Cited
UNITED STATES PATENTS

| | | | |
|---|---|---|---|
| 2,764,951 | 10/1956 | Fisher | 425/331 |
| 2,764,952 | 10/1956 | Meakin | 425/331 |
| 3,108,055 | 10/1963 | Grant | 425/331 |

*Primary Examiner*—Francis S. Husar
*Assistant Examiner*—Robert J. Charvat
*Attorney, Agent, or Firm*—Howson and Howson

[57] ABSTRACT

An improvement for pellet mills for resolving the radial forces which develop between the die and the rollers. An extension is provided on the main shaft extending beyond the roller support frame arms, and a bearing assembly is mounted on the extension for supporting a spider connected to the die cover.

8 Claims, 3 Drawing Figures

MAIN SHAFT SUPPORT FOR PELLET MILLS

This is a continuation of application Ser. No. 517,910, filed Oct. 25, 1974, now abandoned.

The present invention relates generally to pellet mills and relates more particularly to a novel support arrangement for resolving the radial forces which develop between the rollers and the die.

In the conventional pellet mill, for example of the rotating die type, the stationary main pellet mill shaft is supported by a pair of axially spaced bearings about which the die supporting housing rotates. The die housing in turn is journalled by an axially spaced pair of bearings supported by the machine base. The rotating die and the stationary rollers are cooperatively disposed in cantilevered relation beyond the bearings, allowing the unobstructed axial feed of material into the pelleting chamber. This arrangement, although presently used in rotating die machines, causes a considerable stress on the main shaft bearings because of the radial forces developed between the die and the rolls during the extruding of the pellets.

In the present invention, support means is provided at the front end of the die for directly resolving radial forces developed between the main pellet mill shaft and the die. This support means includes an extension of the main shaft beyond the roll support frame. A bearing assembly on the shaft extension supports a spider connected to the die cover. This arrangement, by connecting the die and main shaft on both sides of the rollers resolves the radial forces developed during the pelleting process and reduces the heavy stresses which would otherwise be presented to the main shaft bearings. The infeed of material to be pelleted is not significantly impeded by the present shaft support arrangement since the material will readily flow through the rotating spider.

It is accordingly a first object of the present invention to provide an improved main shaft and die support structure for pellet mills.

A further object of the invention is to provide a pellet mill main shaft support as described which can be adapted to existing pellet mill designs with only minor modifications.

A further object of the invention is to provide an improved pellet mill structure as described which is relatively simple in structure and accordingly would be economical to manufacture and maintain.

Additional objects and advantages of the invention will be more readily apparent from the following detailed description of an embodiment thereof when taken together with the accompanying drawings wherein.

Figure 1:
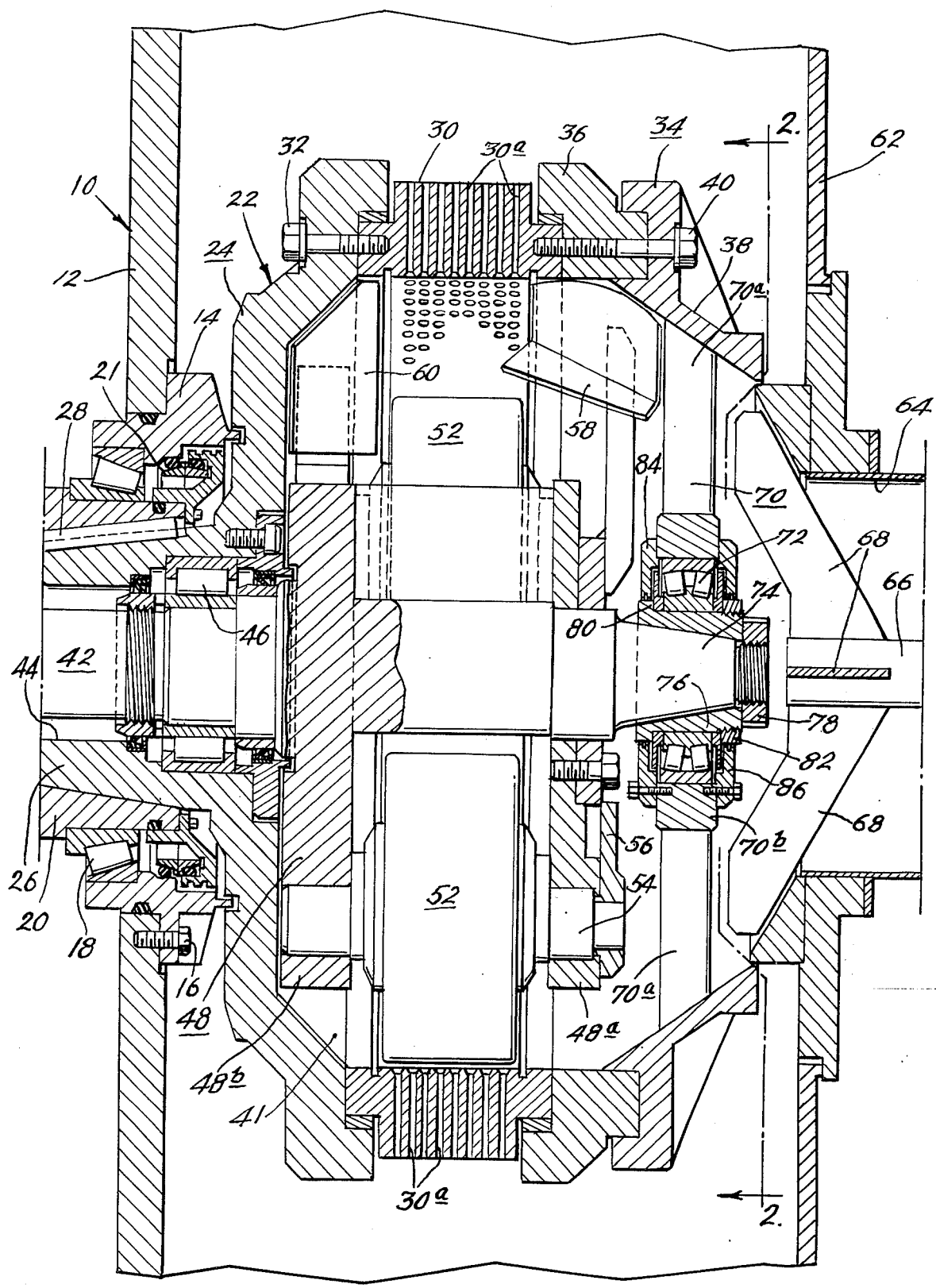
FIG. 1 is a partial side elevational sectional view of a rotating die pellet mill having a main shaft support in accordance with the present invention.
Figure 2:
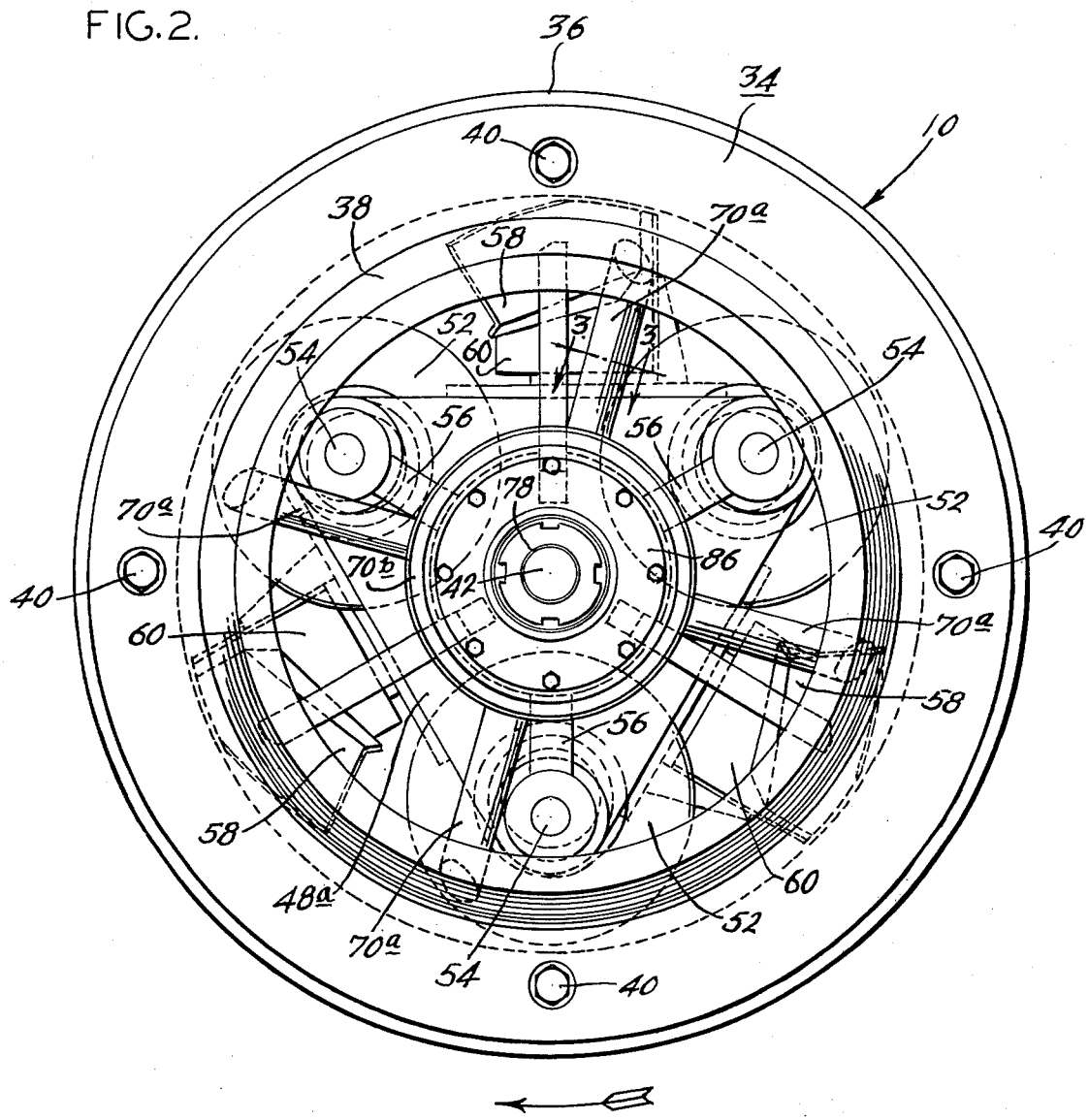
FIG. 2 is a front end view taken along line 2—2 of the pellet mill of FIG. 1, the view being on a reduced scale.

Although it will be evident that the present invention could be employed with either a rotating or a fixed die pellet mill, for purposes of illustration the invention is shown and described as incorporated into a rotating die mill. Referring to the drawings, FIGS. 1 and 2 show a pellet mill generally designated 10 which with the exception of the number of pelleting rolls and the feed distribution system is not dissimilar from conventional rotating die pellet mills such as that shown in U.S. Pat. No. 2,764,951. The pellet mill 10 includes a base having a vertically extending housing wall 12 which is apertured to receive the annular bearing support member 14 secured thereto by bolts 16. Bearing assembly 18 mounted within support member 14 rotatably supports a hollow shaft 20 in conjunction with an axially spaced bearing assembly of similar construction (not shown). A seal assembly 21 on the end of shaft 20 cooperatively engages support member 14.

Demountably secured within the hollow shaft 20 is the pelleting cartridge assembly 22 which includes as a main supporting member the die housing 24. The die housing includes a tapered shank portion 26 adapted to fit within the internally tapered hollow shaft 20 to which it is locked for rotation therewith by key 28. The die housing 24 extends radially in a saucer shaped configuration to the right hand side of support member 14 as viewed in FIG. 1, and carries the annular die 30 which is secured thereto by bolts 32. A die cover 34 is formed of annular ring 36 and frusto-conical member 38, both of which are secured to the die 30 by the bolts 40. The die housing 24, die 30 and die cover 34, which form therewithin a pelleting chamber 41, rotate as a unit with the hollow shaft 20, being driven in a conventional manner by a suitable drive motor.

The pelleting cartridge 22 further includes the main shaft 42 disposed partially within a concentric hollow bore 44 of the die housing shank portion. A pair of axially spaced bearing assemblies 46 (only one of which is shown in FIG. 1) journal the normally stationary main shaft 42 within the bore 44 of the die housing 24. A roller support frame 48 extending from the main shaft 42 within the pelleting chamber 41 supports the three rollers 52 in engagement with the inner surface of the die 30. Specifically, the roller support frame includes triangular shaped front and rear roller support members 48a and 48b which are apertured to receive the eccentric roller support shafts 54. Arms 56 secured to one end of the shaft 54 are provided with conventional adjusting means (not shown) which by rotating the eccentric roller shafts, adjusts the radial location of the roller surface with respect to the inner die surface.

Means are provided for directing the material to be pelleted into the nip of the rollers 52. This means includes front and rear scrapers 58 and 60 extending from the roller support frame 48 adjacent each roller. The scrapers 58 and 60 are contoured to cooperate with the rotating die housing, die and die cover and prevent the buildup of material on the surfaces of those elements.

The pelleting cartridge assembly 22 is enclosed within a casing 62 which may be hinged or otherwise readily demountable to permit access to the cartridge. Material to be pelleted is delivered to the pelleting chamber 41 through a conveyor conduit 64 passing through the casing 62 and concentrically aligned with the cartridge. A paddle type conveyor having a central shaft 66 is illustrated in the present embodiment and is driven in rotation by an independent drive means (not shown). Radially extending blades 68 distribute the delivered material around the periphery of the die cover whereupon it is guided into the nip of the rolls by the scrapers 58.

The pellet mill structure described thus far is essentially conventional with the exception of the die cover structure. The operation of the mill is also conventional, the driving of the shaft 20 in rotation causing a rotation of the die housing, die and die cover about the stationary rollers. Material to be pelleted fed through the infeed conduit 64 and distributed by the blade 68 is channeled by the scrapers 58 and 60 into the nips of the rollers 52 whereupon it is extruded through the die apertures 30a. Knives (not shown) disposed adjacent the outer periphery of the rotating die cut the extruded pellets which then drop by gravity into a suitable collecting hopper.

The improvement of the present invention comrises support means extending between the die cover and an extension of the main shaft to resolve the radial forces developing between the rollers and die. The support means comprises a spider 70 extending inwardly from the die cover member 38. The spider 70 comprises four eliptically shaped legs 70a as shown in section in FIG. 3 which extend inwardly to the spider hub 70b. Bearing assembly 72 mounted on an extended portion 74 of the main shaft 42 rotatably supports the spider and hence the die cover and attached die. The bearing assembly 72 is seated on a sleeve 76 having a tapered internal bore conforming with the tapered shaft extension 74. The sleeve 76 is secured to the shaft extension by nut 78 on the threaded end of shaft 42.

The bearing assembly 72 is secured against a shoulder 80 of the sleeve 76 by a nut 82. Seal plates 84 and 86 bolted on opposite sides of the spider hub 70b cooperate with the sleeve shoulder 80 and the nut 82 to prevent the flow of material to be pelleted from reaching the bearing assembly.

With the present invention, the substantial radial forces developed between the rollers 52 and the die 30 will be resolved between the main shaft 42 and the rotating die housing 24, the die cover 34 through the bearing assemblies 46 and 72. These bearing assemblies are essentially axially equidistant from the rollers and thus divide the stresses developed during the pelleting operation. Since the pelleting forces will be resolved by the bearing assemblies 46 and 72, there should be no moment forces added to the load carried by the conventional main shaft bearings, which load will essentially be the weight of the cantilevered pelleting cartridge.

Figure 3:
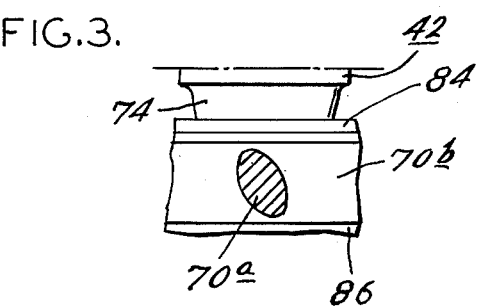
FIG. 3 is a partial sectional view taken along line 3—3 of FIG. 2 to show the details of the spider.

As shown in FIG. 3, the legs 70a of the spider 70 are preferably shaped and angled so as to minimize their interference with the flow of material into the pelleting chamber. In the preferred embodiment illustrated, the webs are of a substantially elliptical shape and are angled to coincide with the path of delivery of the material flow.

Although the above description of a specific embodiment of the invention shows the invention incorporation into a rotating-die type pellet mill, as indicated above, it will be apparent that the invention could be also employed with a pellet mill of the fixed die type wherein the rolls and knives rotate around the die. The invention is accordingly suitable for use with any pellet mill of the cantilevered type characterized by relative rotation of the die and main shaft.

Manifestly, changes in details of construction can be effected by those skilled in the art without departing from the spirit and scope of the invention.

We claim:

1. In a pellet mill comprising a base, a die housing mounted on said base, an annular die and die cover secured to said die housing, said die housing, die and die cover defining a pelleting chamber therewithin, a main shaft supported concentrically within said die housing and extending into said pelleting chamber, a roller support frame extending from said main shaft, a plurality of rollers rotatably supported on said roller support frame in contiguous cooperative relation with said die, means on said die housing and main shaft providing relative rotation of said die housing, die and die cover with respect to said main shaft, roller support frame and rollers, means adjacent said die cover for conveying material to be pelleted into said pelleting chamber, and means on said roller support frame for directing material to be pelleted into the nips of said rollers, the improvement comprising means for resolving the radial forces developed between said rollers and said die during pelleting operations, said latter means comprising an extension of said main shaft beyond said roller support frame, support means extending between said die cover and said main shaft extension and including bearing means permitting relative rotation of said die cover and said main shaft extension, said support means being apertured to permit the passage of material to be pelletized therethrough.

2. In a pellet mill comprising a base, a die housing mounted on said base, an annular die and die cover secured to said die housing, said die housing, die and die cover extending in cantilevered relation to said base and defining a pelleting chamber therewithin, a main shaft supported concentrically within said die housing and extending into said pelleting chamber, a roller support frame extending from said main shaft, a plurality of rollers rotatably supported on said roller support frame in contiguous cooperative relation with said die, means on said die housing and main shaft providing relative rotation of said die housing, die and die cover with respect to said main shaft, roller support frame and rollers, means adjacent said die cover for conveying material to be pelleted into said pelleting chamber, and means on said roller support frame for directing material to be pelleted into the nips of said rollers, the improvement comprising means for resolving the radial forces developed between said rollers and said die during pelleting operations, said latter means comprising an extension of said main shaft beyond said roller support frame, bearing means on said main shaft extension, and support means extending between said die cover and said main shaft extension bearing means, said support means being apertured to permit the passage of material to be pelletized therethrough.

3. In a pellet mill comprising a base, a die housing rotatably mounted on said base, an annular die and die cover secured to said die housing for rotation therewith, said die housing, die and die cover extending in cantilevered relation to said base and defining a pelleting chamber therewithin, a stationary main shaft supported concentrically within said die housing and extending into said pelleting chamber, a roller support frame extending from said main shaft, a plurality of rollers rotatably supported on said roller support frame in contiguous cooperative relation with said die, means adjacent said die cover for conveying material to be pelleted into said pelleting chamber, and means on said roller support frame for directing material to be pelleted into the nips of said rollers, the improvement comprising means for resolving the radial forces developed between said rollers and said die during pelleting operations, said latter means comprising an extension of said main shaft beyond said roller support frame, bearing means on said main shaft extension, and support means extending between said die cover and said main shaft extension bearing means, said support means being apertured to permit the passage of material to be pelletized therethrough.

4. The invention as claimed in claim 3 wherein said support means comprises a spider having a hub journalled on said main shaft extension bearing means, and a plurality of legs extending between said hub and said die cover.

5. The invention as claimed in claim 4 wherein said spider legs are substantially elliptical in cross section.

6. The invention as claimed in claim 4 wherein said spider legs are angularly disposed in alignment with the direction of material infeed passing therebetween.

7. The invention as claimed in claim 4 wherein said means for conveying material into said pelleting chamber comprises a feed conveyor concentrically aligned with said main shaft.

8. The invention as claimed in claim 7 wherein said feed conveyor comprises a paddle type conveyor having distributing paddles disposed adjacent said spider for directing material into said pelleting chamber.

* * * * *